J. Berlien,
Billiard Cushion.
No. 104,542.                    Patented Jun. 21, 1870.
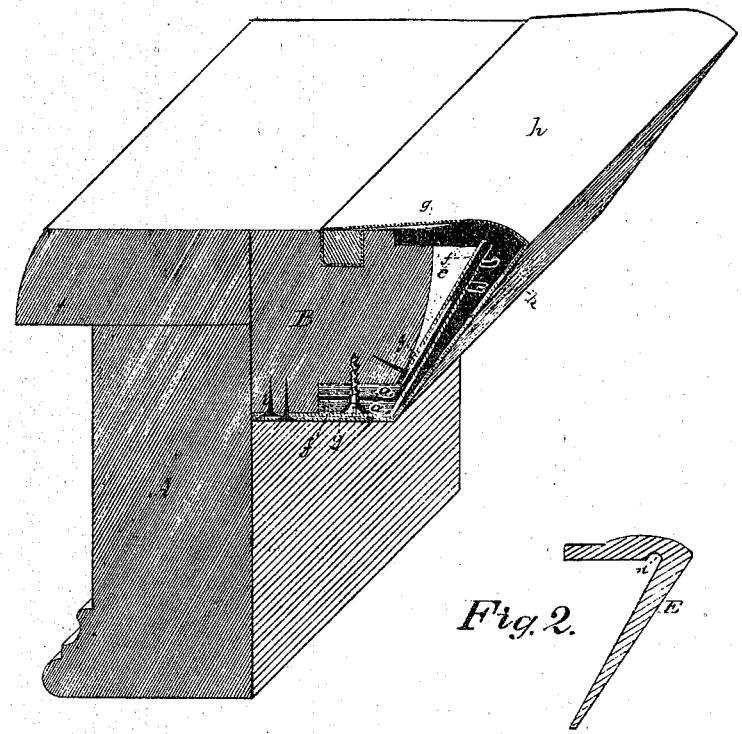
Witnesses
Thomas Taylor Jr
Phil. T. Dodge
Inventor,
John Berlien
by Dodge & Munn
his Attys.

United States Patent Office.

JOHN BERLIEN, OF CHICAGO, ILLINOIS.

Letters Patent No. 104,542, dated June 21, 1870.

IMPROVEMENT IN BILLIARD-CUSHIONS.

The Schedule referred to in these Letters Patent and making part of the same.

To all whom it may concern:

Be it known that I, JOHN BERLIEN, of Chicago, in the county of Cook and State of Illinois, have invented certain Improvements in Billiard-Cushions, of which the following is a specification, reference being had to the accompanying drawing.

My present invention relates to certain improvements upon the billiard-cushion, for which Letters Patent of the United States were granted to me February 1, 1870, No. 99,393; and It consists, principally, in the use, in connection with the steel spring described therein, of a peculiarly shaped rubber cushion or covering over the same.

Figure 1 is a perspective view of a section of the rim of a table having my improved cushion applied; and Figure 2 is a cross-section of the rubber cushion or covering.

The rim A of the table I construct in the usual manner, with the cleat B attached to it, and the lower front edge of the cleat I cut away to receive the lower edge of the steel spring D, with its strengthening strips $a$, which are secured rigidly to the cleat, as shown, being in the same manner as in my previous patent, so as to leave the upright inclined portion of the steel free to yield under the impact of the ball, striking in line with its upper edge.

Between the steel and the cleat, to the lower front edge of the latter, I secure the edge of a sheet of rubber cloth, $f$, and then draw this rubber cloth tightly over the upper edge of the steel spring and down over the face of the same and tack or otherwise secure its edge to the under side of the cleat, as shown at $i$, fig. 1.

The space between the cleat and steel I fill with wool, hair, cotton, or similar material, as shown at $c$, fig. 1, to aid in deadening the metallic sound of the steel when the ball strikes the cushion.

I next provide a cast-rubber strip or cushion, E, the cross-section of which resembles in its general outline the Arabic numeral 7, the exact form of which is, however, clearly shown in fig. 2; this rubber I fit over the spring and cleat, as shown in fig. 1, cementing its depending portion to the front side of the rubber-cloth covering of the steel and the edge of its upper portion into a recess made for the purpose in the upper front edge of cleat B.

The front side of this rubber strip is made of about one-fourth of an inch in thickness at the top, but of decreasing thickness toward the lower side, where it is brought to a thin edge, as shown, and the rubber is so shaped that its front edge, against which the ball impinges, is in the same horizontal plane as the upper edge of the steel spring D, the rubber being formed with a groove, $n$, into which the edge of the steel fits, as shown.

I next secure the edge of a sheet of muslin, $g$, to the under side of the cleat B, and draw it snugly up over the rubber, and cement its edge to the top of the cleat, and over this muslin I stretch the usual green covering cloth $h$, and secure its lower edge to the under side of the cleat, and its upper edge to the top of the cleat, by means of a strip set into a groove in the usual manner, as shown in fig. 1.

When thus constructed, the steel spring gives the required stiffness and elasticity to the cushion, and maintains the rubber facing in a perfectly true line, while the rubber serves principally to deaden the metallic sound and prevent the edge of the steel from cutting through the covering, although it, as a matter of course, adds somewhat to the elasticity of the cushion.

Having thus described my invention,

What I claim is—

The combination of the steel spring D and the rubber cushion E, when constructed and arranged substantially as set forth.

JOHN BERLIEN.

Witnesses:
F. BLUMENHAGEN,
WM. H. LOTZ.